United States Patent
Chang et al.

(10) Patent No.: US 8,130,616 B2
(45) Date of Patent: Mar. 6, 2012

(54) DEVICE AND METHOD FOR DETECTING BLANK AREA IN OPTICAL DISC

(75) Inventors: Chia-Ming Chang, Hsinchu (TW); Shao-Lun Hung, Taichung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 724 days.

(21) Appl. No.: 12/244,288

(22) Filed: Oct. 2, 2008

(65) Prior Publication Data

US 2009/0092021 A1 Apr. 9, 2009

(30) Foreign Application Priority Data

Oct. 3, 2007 (TW) .............................. 96137081 A

(51) Int. Cl.
G11B 27/36 (2006.01)
(52) U.S. Cl. ................................ 369/53.24
(58) Field of Classification Search .................. None
See application file for complete search history.

(56) References Cited

U.S. PATENT DOCUMENTS

| 6,728,180 | B1 | 4/2004 | Park |
| 2004/0057365 | A1 | 3/2004 | Chen et al. |
| 2007/0280069 | A1* | 12/2007 | Cheng et al. ............... 369/47.25 |
| 2007/0280070 | A1* | 12/2007 | Cheng et al. ............... 369/47.25 |
| 2007/0280071 | A1* | 12/2007 | Cheng et al. ............... 369/47.25 |
| 2007/0280072 | A1* | 12/2007 | Hsieh et al. ............... 369/47.25 |

* cited by examiner

*Primary Examiner* — Thang Tran
*Assistant Examiner* — Huy D Nguyen
(74) *Attorney, Agent, or Firm* — WPAT, PC; Justin King

(57) ABSTRACT

A method and a device of distinguishing blank area from non-blank area in an optical disc are provided. An input signal such as a DPD TE signal or RF ripple signal is first filtered to obtain a filtered signal. A subtracting operation of the input signal and the filtered signal is then performed to obtain a first signal. According to a peak value and a bottom value of the first signal, the first signal is processed into a second signal. By comparing the second signal with a reference signal, whether the currently read area is blank area or non-blank area can be discriminated. An indicating signal is outputted at a first value to indicate the blank area while the indicating signal is outputted at a second value to indicate the non-blank area.

8 Claims, 6 Drawing Sheets

DEVICE AND METHOD FOR DETECTING BLANK AREA IN OPTICAL DISC

FIELD OF THE INVENTION

The present invention relates to detecting device and method used in an optical disc drive, and more particularly to a device and a method for detecting blank area in an optical disc by an optical disc drive.

BACKGROUND OF THE INVENTION

In the industry of optical disc drives, optical drives are enhanced from the early developed read-only optical disc drives, e.g. CD-ROM drives or DVD-ROM drives, to the present recordable optical disc drives, e.g. CD-RW drives, DVD-RW drives and DVD+RW drives. As known, the tracks of a recordable disc to be written by the recordable optical drives have wobble marks, such that a wobble signal can be obtained by decoding the wobble marks, thereby positioning absolute positions where data are to be written.

Generally, the recordable disc drive writes data into the optical disc from inner tracks to outer tracks. Therefore, when the quantity of data written into the recordable disc drive is not large enough to fill all tracks of the optical disc, there would be blank in the outer track area of the optical disc. Data may subsequently be written into the blank area at one or more times until the optical disc is finalized by the recordable disc drive to refuse further data.

An optical disc with blank area has no problem being accessed by a recordable disc drive, regardless of the possible focusing location of an optical pickup head in the blank area. In contrast, if a read-only optical disc drive is used to access the optical disc with blank area, the optical pickup head has to focus on a track in the data area other than in the blank area. It is because the servo control system of the read-only optical disc drive cannot generate any wobble signal and track cross signal, and thus a track-on operation cannot be performed in the blank area. Accordingly, the servo control system of the read-only optical disc drive would fail if the optical pickup head focuses on a track in the blank area. Once the servo control system fails, it would take a long time for the read-only optical disc drive to recover to work, so the performance of the read-only optical disc drive is adversely affected.

Currently, one of the most popular applications of a read-only optical disc drive is the use in a player system, e.g. a DVD player. In the player system, if a track-on operation of an optical disc cannot be successfully executed due to the presence of blank area, the optical disc will still be deemed invalid, which often bothers the user very much. Therefore, a variety of prior art has tried to solve the problem.

For example, U.S. Pat. Pub. No. 2004/0057365 entitled "method and apparatus for detecting the blank region of the optical storage medium" proposes a solution to the problem. Referring to FIG. 1, the detecting apparatus includes a waveform detection module 52, a programmable gain amplifier 56, a selective gain boost module 54, and a blank region judgment module 58. The blank region judgment module 58 further includes a slicing comparator 59 and a high/low (H/L) pulse detector 60. According to the detecting apparatus, whether the focusing location of the optical pickup head is in the data area or the blank area is determined by selectively amplifying the 3 T~11 T frequency of the radio frequency (RF) signal and comparing it with a preset reference level.

U.S. Pat. No. 6,728,180 entitled "Blank detection circuit and method therefore" proposes another solution to the problem. As illustrated in FIG. 2, the blank detection circuit includes an analog/digital converter (ADC) 102, edge detector 104, maximum/minimum value detector 106, determiner 108, and blank signal generator 110. An RF signal generated by an optical pickup head is converted into a digital RF signal by the analog/digital converter 102. Then the edge detector 104 and the maximum/minimum value detector 106 determine the interval between the detected edges of the digital RF signal and the amplitude of the digital RF signal. The determiner 108 determines whether or not the optical pickup head is being situated in blank area of the optical disc according to the determined interval and amplitude. If it is, the blank signal generator outputs a blank signal.

As described above, the prior art blank area detection methods are determined with RF signals, e.g. depending on whether the amplitude of the RF signal exceeds a preset reference level or whether the RF signal contains a valid data length (3 T~11 T). If not, the location in the blank area is determined. However, if the reflective rate of the detected optical disc is higher or lower than that generalized in the specification, the amplitude of the resulting RF signal may become higher or lower than usual. Under this circumstance, the comparison of the amplitude with the preset reference level is indefinite and thus the detecting result becomes unreliable.

SUMMARY OF THE INVENTION

Therefore, the present invention provides a device and a method for detecting blank area in an optical disc by an optical disc drive, which is relatively reliable.

The present invention provides a device for detecting blank area of an optical disc being read by an optical disc driver. The device includes a filter for receiving and filtering an input signal to obtain a filtered signal; a first subtracter coupled to the filter for receiving and performing a subtracting operation of the input signal and the filtered signal to obtain a first signal; a peak processor coupled to the first subtracter for receiving and processing the first signal into a second signal according to a peak value and a bottom value of the first signal; and a discriminator coupled to the peak processor for receiving and comparing the second signal with a reference signal, and outputting an indicating signal according to the comparing result. The input signal, for example, is a differential phase detection tracking error signal or a radio frequency ripple signal.

The present invention also provides a method for detecting blank area of an optical disc being read by an optical disc driver. The method includes filtering an input signal to obtain a filtered signal; subtracting the filtered signal from the input signal to obtain a first signal; processing the first signal into a second signal according to a peak value and a bottom value of the first signal; comparing the second signal with a reference signal; outputting an indicating signal indicative of the blank area when the second signal is greater than the reference signal; and outputting the indicating signal indicative of non-blank area when the second signal is less than the reference signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention.

In an optical disc drive, in response to a laser beam emitted by a laser diode of an optical pickup head and reflected by an optical disc, a photo detector of the optical pickup head generates a plurality of corresponding signals, based on which a radio frequency (RF) signal and a differential phase detection tracking error (DPD TE) signal are realized. The present invention is principally based on the DPD TE signal and the like to determine whether the optical pickup head is currently situated in blank area of the optical disc or not. The blank area detecting means may be applied to a variety of optical discs including DVD, Blu-ray disc, etc.

Figure 1:
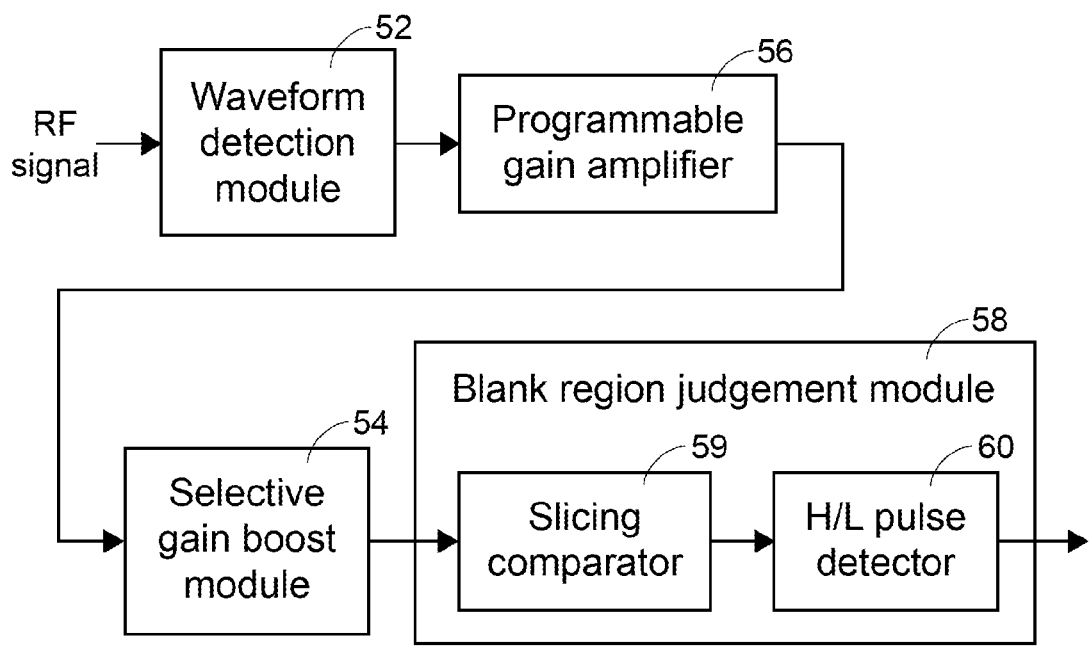
FIG. 1 is a functional block diagram schematically illustrating blank-area detecting means of prior art.
Figure 2:
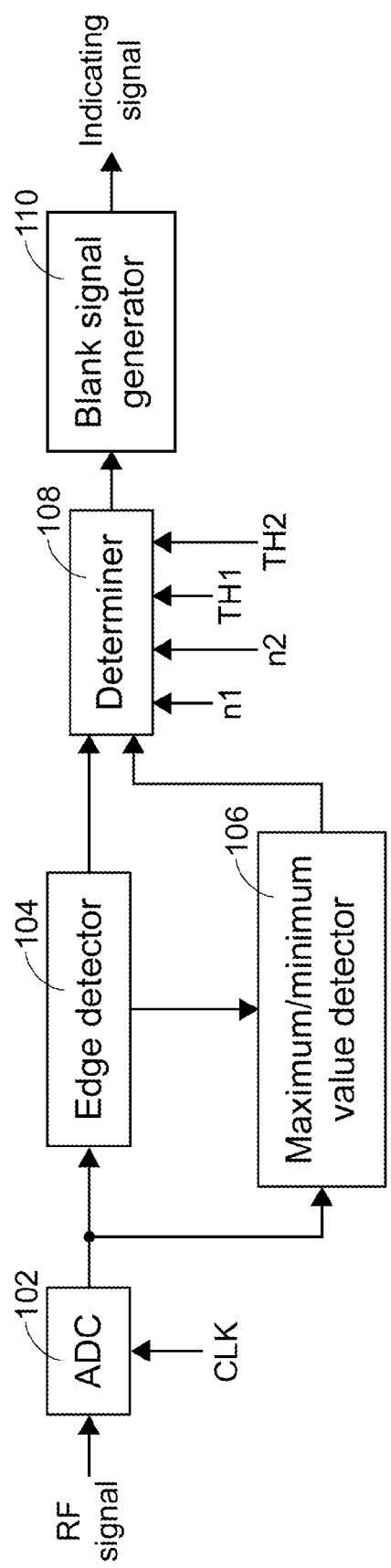
FIG. 2 is a functional block diagram schematically illustrating blank-area detecting means of another prior art.
Figure 3:
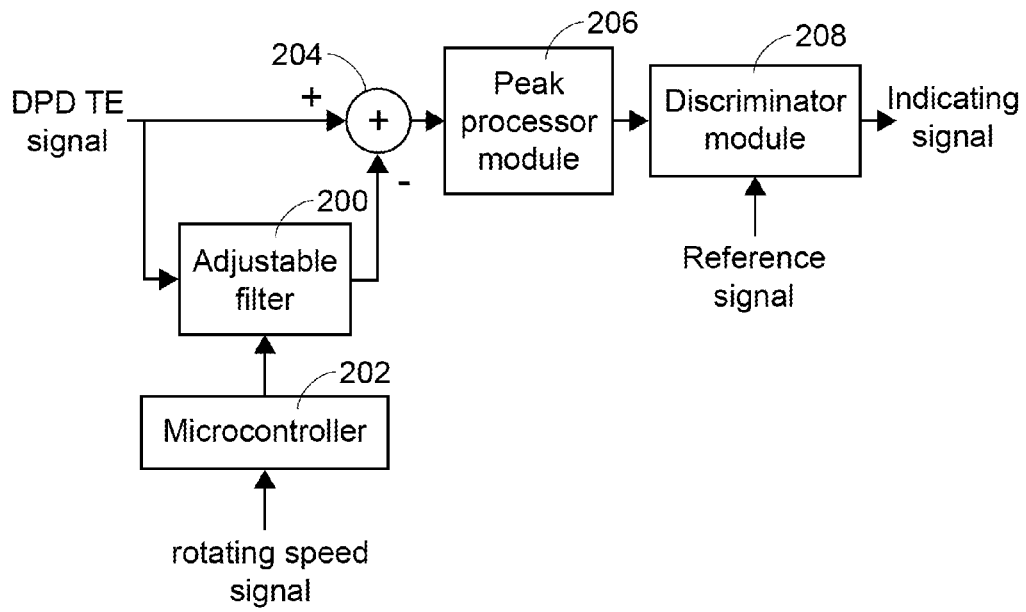
FIG. 3 is a functional block diagram schematically illustrating blank-area detecting means according to an embodiment of the present invention.

Please refer to FIG. 3, in which a blank-area detecting device according to an embodiment of the present invention is illustrated. The blank-area detecting device includes a microcontroller 202, an adjustable filter 200, a first subtracter 204, a peak processor 206 and a discriminator 208. The microcontroller 202 is connected to the adjustable filter 200. According to the rotating speed signal of a spindle motor, the microcontroller 202 can adjust gains of the filter 200 at different frequencies. Then the filter 200 can receive the DPD TE signal and filter it to obtain a filtered DPD TE signal. The DPD TE signal and the filtered DPD TE signal are both inputted into the first subtracter 204 to be operated with a subtraction operation so as to output a first signal. The peak processor 206 receives and processes the first signal into a second signal according to peak and bottom values of the first signal. The discriminator 208 receives and compares the second signal with a reference signal to generate an indicating signal.

Figure 4:
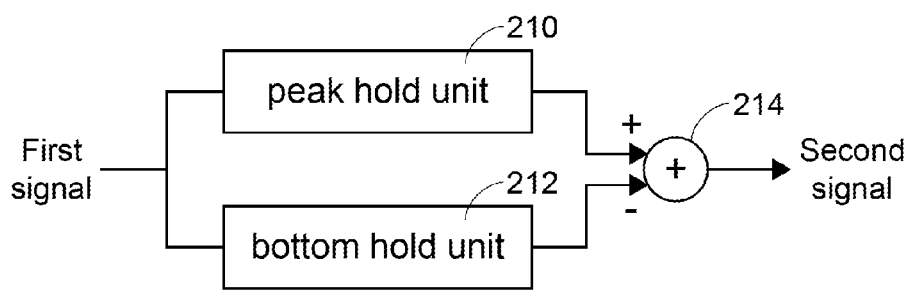
FIG. 4 is a functional block diagram schematically illustrating a peak processor applicable to the blank-area detecting means of FIG. 3.

The operation of the peak processor 206 will be described hereinafter with reference to the embodiment of FIG. 4. The peak processor 206 includes a peak hold unit 210, a bottom hold unit 212 and a second subtracter 214. The peak hold unit 210 and the bottom hold unit 212 outputs a peak envelope signal and a bottom envelope signal in response to the first signal, respectively. The second subtracter 214 performs a subtraction operation of the peak envelope signal and the bottom envelope signal to generate the second signal. In addition to the above-described circuitry, the peak processor 206 can also be implemented with other conventional means, e.g. software.

Figure 5A:
FIG. 5A~FIG. 5E are waveform diagrams illustrating typical waveform variations of signals derived from a DPD TE signal when the optical pickup head is situated in blank area of the optical disc.
Figure 5B:
Figure 5C:
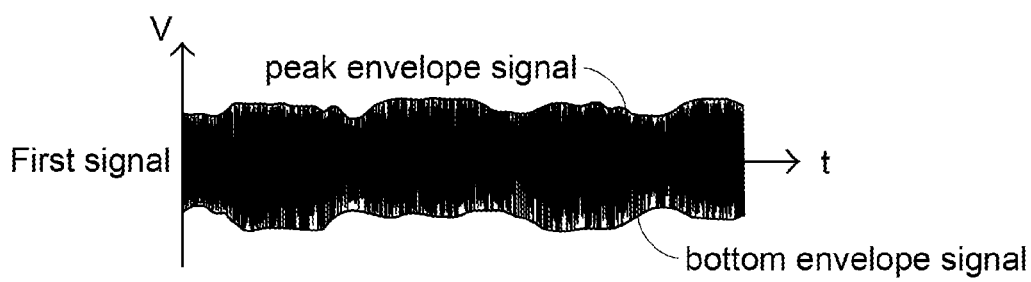
Figure 5D:
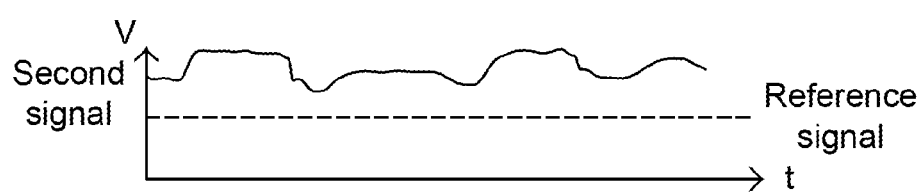
Figure 5E:

For example, when the DPD TE signal is exemplified in FIG. 5A, the filtered DPD TE signal outputted by the adjustable filter 200 is illustrated in FIG. 5B; the first signal, which is a difference signal between the DPD TE signal and the filtered DPD TE signal, is shown in FIG. 5C; and the second signal, which is a difference signal between the peak envelope signal and the bottom envelope signal, is shown in FIG. 5D. Since the second signal as shown in FIG. 5D is higher than the reference signal, the indicating signal is outputted with a predefined level, e.g. a low level, as shown in FIG. 5E. The low-level indicating signal indicates that the optical pickup head is situated in blank area of an optical disc, where no data has been recorded.

Figure 6A:
FIG. 6A~FIG. 6E are waveform diagrams illustrating typical waveform variations of signals derived from a DPD TE signal when the optical pickup head is situated in data area of the optical disc.
Figure 6B:
Figure 6C:
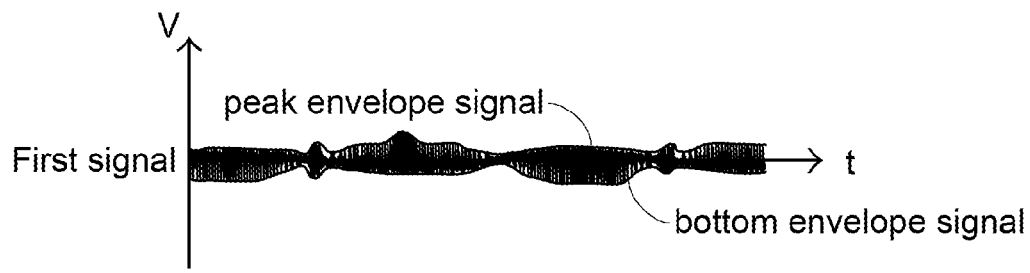
Figure 6D:
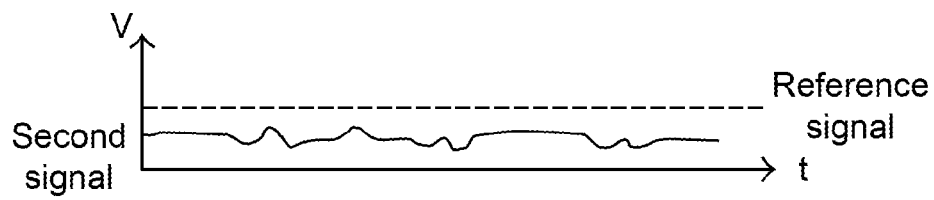
Figure 6E:
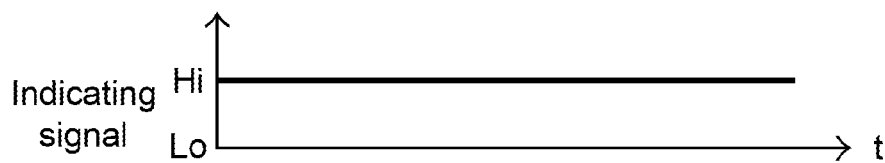
Figure 7A:
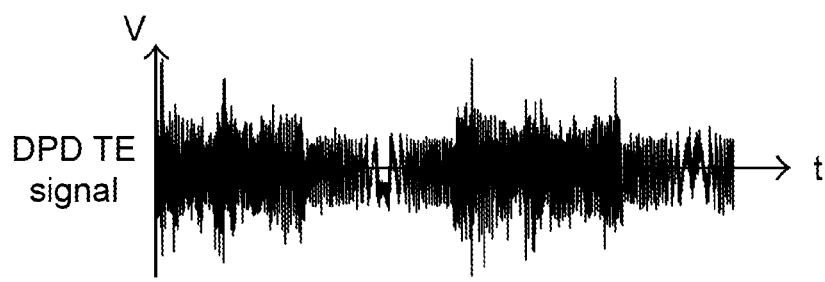
FIG. 7A~FIG. 7E are waveform diagrams illustrating typical waveform variations of signals derived from a DPD TE signal when the optical pickup head is situated around the border between the blank area and the data area of the optical disc.
Figure 7B:
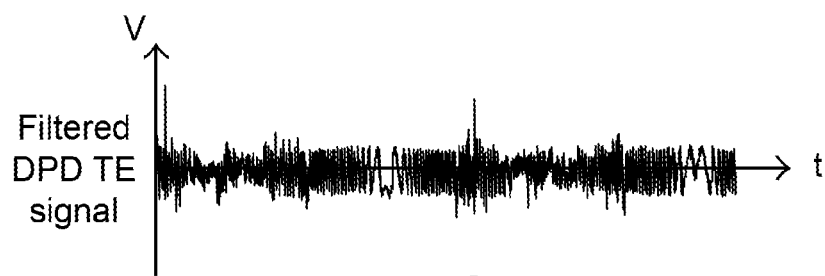
Figure 7C:
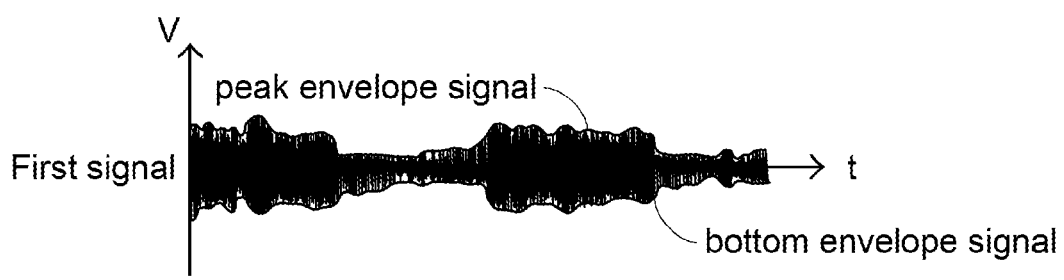
Figure 7D:
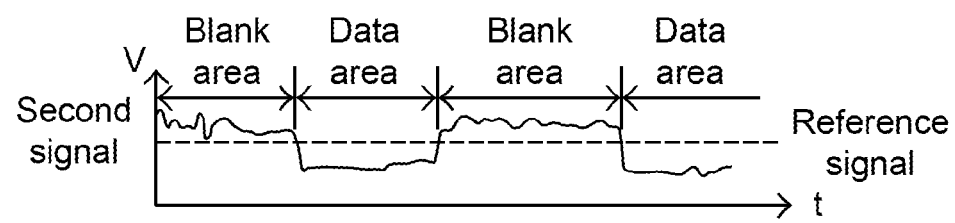
Figure 7E:
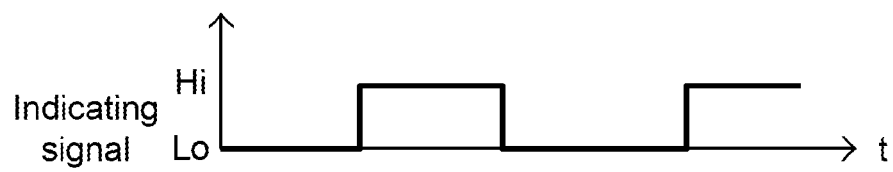

In another example, the DPD TE signal, the filtered DPD TE signal, the first signal and the second signal are for example as shown in FIGS. 6A, 6B, 6C and 6D. It is seen from FIG. 6D that the second signal is lower than the reference signal, so the indicating signal with another predefined level, e.g. a high level, is outputted as shown in FIG. 6E. It is indicated that the optical pickup head is situated in data area of the optical disc, where data has been previously recorded.

If the optical pickup head is situated around the border between the blank area and the data area, the DPD TE signal, the filtered DPD TE signal, the first signal, the second signal and the indicating signal are for example as shown in FIGS. 7A, 7B, 7C, 7D and 7E. In this example, the indicating signal may cross the border between the blank area and the data area to and fro due to disk runout. Therefore, the second signal is sometimes higher and sometimes lower that the reference signal. As a result, the indicating signal reveals a toggling signal.

As described above, the present invention determines whether an optical pickup head is currently situated in blank area of an optical disc is principally based on the DPD TE signal. As known to those ordinary in the art, the DPD TE signal, unlike the RF signal, is substantially independent from the reflection rate of the optical disc. Therefore, it is relatively reliable.

In lieu of the DPD TE signal, an RF ripple (RFRP) signal can be used with the above-described detecting device to execute similar operations and achieve similar objects.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for detecting blank area of an optical disc being read by an optical disc driver, comprising:
   an adjustable filter for receiving and filtering an input signal to obtain a filtered signal;
   a microcontroller coupled to the adjustable filter for adjusting gains of the adjustable filter at different frequencies according to a rotating speed of a spindle motor of the optical disc drive;

a first subtracter coupled to the adjustable filter for receiving and performing a subtracting operation of the input signal and the filtered signal to obtain a first signal;

a peak processor coupled to the first subtracter for receiving and processing the first signal into a second signal according to a peak value and a bottom value of the first signal; and a discriminator coupled to the peak processor for receiving and comparing the second signal with a reference signal, and outputting an indicating signal according to the comparing result.

2. The device according to claim 1 wherein the input signal comprises a differential phase detection tracking error signal or a radio frequency ripple signal.

3. The device according to claim 1 wherein the peak processor comprises:

a peak hold unit for generating a peak envelope signal of the first signal;

a bottom hold unit for generating a bottom envelope signal of the first signal; and a second subtracter coupled to the peak hold unit and the bottom hold unit and performing a subtracting operation of the peak envelope signal and the bottom envelope signal to obtain the second signal.

4. The device according to claim 1 wherein the indicating signal is outputted at a first level to indicate the blank area when the second signal is greater than the reference signal; and the indicating signal is outputted at a second level to indicate non-blank area when the second signal is less than the reference signal.

5. A method for detecting blank area of an optical disc being read by an optical disc driver, comprising:

filtering an input signal to obtain a filtered signal;

subtracting the filtered signal from the input signal to obtain a first signal;

processing the first signal into a second signal according to a peak value and a bottom value of the first signal;

comparing the second signal with a reference signal;

outputting an indicating signal indicative of the blank area when the second signal is greater than the reference signal; and outputting the indicating signal indicative of non-blank area when second signal is less than the reference signal;

wherein a plurality of gains at different frequencies according to a rotating speed of a spindle motor of the optical disc drive are provided when performing the filtering operation.

6. The method according to claim 5 wherein the input signal comprises a differential phase detection tracking error signal or a radio frequency ripple signal.

7. The method according to claim 5 wherein the indicating signal indicative of the blank area and the indicating signal indicative of the non-blank area have different levels.

8. The method according to claim 5 wherein the second signal is obtained by subtracting a bottom envelope signal of the first signal from a peak envelope signal of the first signal.

* * * * *